June 2, 1959   J. C. LAYTON ET AL   2,889,147
DISPENSING MACHINE FOR STRIP MATERIAL
Filed Jan. 18, 1955
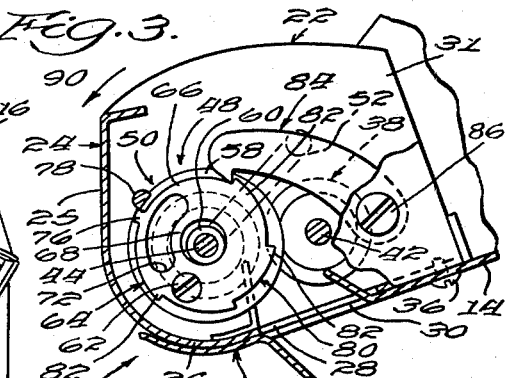
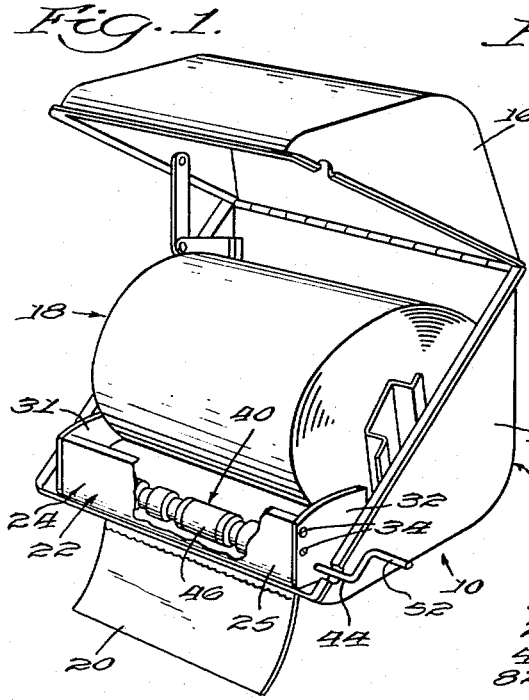
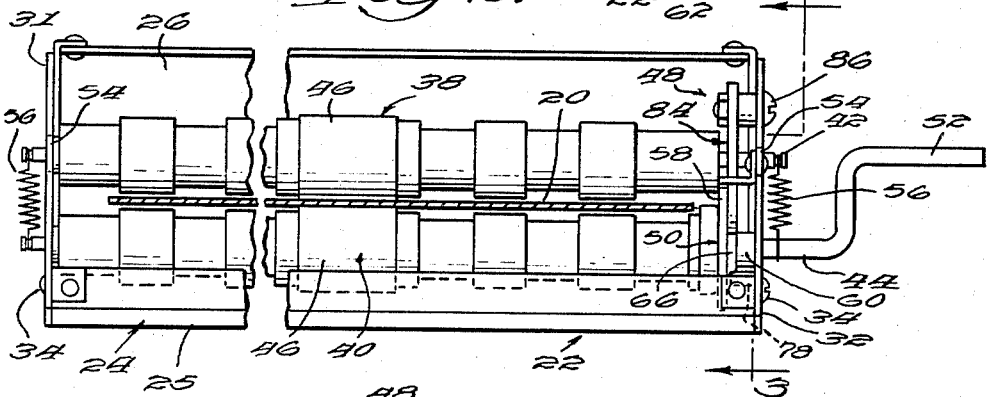
Inventors:
J. C. Layton and
Ralph Shaffer.
BY Thomas C. Mahoney.
Atty.

United States Patent Office 2,889,147
Patented June 2, 1959

2,889,147

DISPENSING MACHINE FOR STRIP MATERIAL

J.C. Layton and Ralph Shaffer, Los Angeles County, Calif., assignors to Towlsaver, Inc., Los Angeles, Calif., a corporation of California Application January 18, 1955, Serial No. 482,544

13 Claims. (Cl. 271—2.3)

This invention relates to a dispensing machine for strip material such as rolled paper towels and, more particularly, to a dispensing machine for strip material having a demountable dispensing unit mounted in the housing thereof with said unit incorporating rotation control means adapted to limit the dispensing of the strip material to a predetermined extent.

In order to illustrate the construction and mode of operation of the strip dispensing machine of our invention, it will be described as utilized to dispense roll paper toweling and to limit the dispensing of said roll paper toweling to a predetermined amount. However, it is obvious that the strip dispensing machine of our invention can be utilized to dispense cloth toweling and other material which is marketed in strip and roll form.

Dispensers of the character under consideration here are subjected to considerable abuse since the dispensing control mechanism utilized to limit the dispensing of a predetermined amount of toweling is continually in use and efforts are frequently made by the users of the dispensing machine to circumvent the dispensing control mechanism by placing undue loads thereupon. In addition, the continuous user of the dispensing machine ultimately results in the wearing out of component portions of the dispensing mechanism and the dispensing control incorporated therein and it is necessary, in conventional machines, to replace the entire machine and return the machine to the factory in order that the dispensing mechanism may be repaired.

It is, therefore, an object of our invention to provide a dispensing machine for strip material in which the dispensing mechanism is mounted in a separate, demountable frame which can be readily mounted in and removed from the housing of the dispensing machine. Therefore, when component parts of the dispensing mechanism of the machine are worn out or become maladjusted, it is a simple task to remove the dispensing mechanism from the housing of the machine of our invention and to install a new mechanism in its place.

The dispensing mechanism of the machine of our invention is constituted by a plurality of rollers and rotation control means is incorporated in the dispensing mechanism to limit the rotation of the dispensing rollers to control the dispensing of the paper toweling from the machine.

Another object of our invention is the provision of a rotation control unit for the dispensing mechanism which is designed to limit the rotation of the dispensing rollers so that only a predetermined amount of toweling will be dispensed during a certain sequence of operation of the dispensing mechanism. An associated object of our invention is the provision of a rotation control unit of the aforementioned character which will also limit reverse rotation of the dispensing rollers to prevent the paper toweling from becoming dislodged from the dispensing rollers.

An additional object of our invention is the provision of a rotation control unit of the aforementioned character which is constituted by a disc pivotally mounted on the end of one of the rollers, said disc being oscillatable on and rotatable with said one roller and being movable between a first locked position and a second unlocked position whereby, when the disc is located in the first locked position, dispensing of toweling from the machine will be momentarily interrupted to prevent wastage of said toweling and whereby, when the disc is disposed in the second unlocked position, free rotation of said one roller through a dispensing operation will be permitted.

A further object of our invention is the provision on said disc of detent means for preventing reverse rotation of the one roller beyond a predetermined point so that rotation of the one roller in both directions is limited by the same disc.

Other objects and advantages of our invention will be apparent from the following specification and the accompanying drawing which is for the purpose of illustration only and in which:

Fig. 1 is a perspective view showing a strip dispensing machine constructed in accordance with our invention;

Fig. 2 is a top plan view of the dispensing mechanism incorporated in the machine;

Fig. 3 is a vertical, partly sectional view taken on the broken line 3—3 of Fig. 2 and showing the rockable control disc mounted on one of the rollers located in its first locked position;

Fig. 4 is a vertical sectional view showing the rockable control disc located in the second unlocked position; and Fig. 5 is a vertical sectional view showing the rockable control disc located in the position which it assumes during the rotation of the dispensing roller upon which it is mounted.

Referring to the drawing and particularly to Fig. 1 thereof, we show a dispensing machine 10 for strip material, said dispensing machine including a housing 12 which is composed of a bottom section 14 and a top section 16 hingedly connected to said bottom section at its lower edge. The top section 16 thus constitutes a cover for the bottom section 14 which is adapted to receive a roll 18 of paper towels 20. Located in the forward portion of the bottom section 14 is a dispensing mechanism 22, said dispensing mechanism being adapted to dispense a limited length of towel during each dispensing operation thereof.

The dispensing mechanism 22 includes an elongated frame 24, said frame being constituted by a front panel 25 formed from sheet metal and having a bottom wall 26 formed integrally therewith. The bottom wall 26 is, as best shown in Figs. 3–5 of the drawing, provided with a transversely oriented dispensing opening 28 which is juxtaposed to a dispensing opening 30 of substantially the same dimensions formed in the bottom section 14 of the housing 12 of the dispensing machine 10. Secured to the opposite ends of the frame 24 are end panels 31 and 32, screws 34 being utilized to insure the structural integration of the end panels 31 and 32 with the remainder of the frame 24.

The frame 24 is demountably secured to the bottom section 14 of the housing 12 by means of screws 36, as best shown in Fig. 3 of the drawing, said screws extending upwardly through the bottom wall of the bottom section 14 and into the bottom wall 26 of the frame 24. Therefore, if any portion of the dispensing mechanism 22 should fail or be worn out, it is possible to replace the dispensing mechanism 22 by merely removing the screws 36 and inserting a substitute dispensing mechanism in its place. In this manner, the necessity for removing the housing 12 from the wall, not shown, upon which it is mounted and substituting a complete dispensing machine 10 in its place is eliminated.

The dispensing mechanism 22 includes a pair of dispensing rollers 38 and 40, said rollers being mounted for rotation on axially extending shafts 42 and 44, respectively, which are journaled in the end panels 31 and 32 of the frame 24. The rollers 38 and 40 are provided with annular, centrally located protuberances 46 intermediate their ends which facilitate frictional engagement with the opposite surfaces of the strip of paper towel 20 so that rotation of the rollers 38 and 40 will cause concomitant dispensing of the paper towel 20 through the dispensing openings 28 and 30.

In order to prevent wastage of the towels 20, a dispensing control 48 is incorporated in the dispensing mechanism 22 and includes a rotation control unit 50 adapted to limit rotation of the dispensing roller 40 and thus to limit the amount of paper towel 20 dispensed during a single dispensing operation of the dispensing mechanism 22.

Formed integrally with the right-hand shaft 44 is a handle 52 which extends outwardly beyond the housing 12 and which, when rotated, causes concomitant rotation of the shaft 44 and the roller 40 mounted thereupon. The shaft 42 has its opposite ends mounted in an oversize opening 54 in the end panels 31 and 32 of the frame 24, as best shown in Fig. 2 of the drawing, so that tension springs 56 will draw the shaft 42 toward the shaft 44 and cause maximum frictional engagement of the annular protuberances 46 of the rollers 38 and 40 with each other and with the opposite sides of a strip of paper toweling 20 inserted therebetween. Consequently, when the roller 40 is rotated, the frictional engagement of the roller 40 with the one surface of the strip of paper toweling 20 will cause the rotation of the roller 38 frictionally engaged with the other surface of said strip of toweling to dispense the same.

Pressed onto the shaft 44 and juxtaposed to the end of the roller 40 is a mounting plate 58, said mounting plate having an annular boss 60 formed integrally therewith. Pivotally mounted on the plate 58, as by means of a screw 62, is a rockable control member 64 constituted by a disc 66 having a substantially centrally located opening 68 formed therein.

The boss 60 of the mounting plate 58 is located in the centrally located opening 68 of the disc 66 and the shaft 44 extends therethrough. Formed in the disc at one side of the centrally located opening 68 is an elongated opening 72, the opening 72 serving to lighten the side of the disc in which it is formed to provide a control member 64 which is unbalanced about its axis of rotation for a purpose which will be described in greater detail below.

The centrally located opening 68 in the disc 66 is of substantially larger diameter than the annular boss 60 so that the disc 66 can rock or oscillate upon the mounting plate 58 during the rotation of said plate concomitantly with the rotation of the roller 40. Formed upon the peripheral edge of the disc 66 and extending radially therefrom is a first detent means 74 constituted by a lug 76. The lug 76 is intended to engage a stop 78 mounted upon the end panel 32 and juxtaposed to the periphery of the disc 66. Also provided upon the peripheral edge of the disc 66 are second detent means 80 constituted by ratchet teeth 82 engageable by a pawl 84 which is pivotally mounted by means of a screw 86 for rotation upon the end panel 32 of the frame 24.

The operation of the rotation control unit 50 is as follows:

When a user rotates the handle 52 to cause clockwise rotation of the shaft 44, as indicated by the arrow 88 in Fig. 5 of the drawing, the mounting plate 58 and the disc 66 are rotated concomitantly. When the rotation of the mounting plate 58 locates the side of the disc 66 having the greater mass above the side of the disc having the lightening opening 72 therein and thus the smaller mass, the disc 66 will rock or pivot on the mounting plate 58 into the position shown in Fig. 5 of the drawing wherein the outermost extremity of the lug 76 is juxtaposed to the edge of the mounting plate 58.

As the clockwise rotation of the mounting plate 58 continues, the lug 76 ultimately engages the stop 78 to prevent and limit the clockwise rotation of the shaft 44 and the roller 40 mounted thereupon to correspondingly limit the amount of towelling dispensed from the machine 10 during a single dispensing operation. When the stop 78 is engaged by the lug 76 constituting the first detent means on the disc 66, the pawl 84 engages the ratchet tooth on the disc 66 which is disposed on the opposite side of the stop 78, as best shown in Fig. 3 of the drawing.

If an attempt is made to continue the rotation of the handle 52, the lug 76 will remain against the stop 78 and resist such attempt. However, if the handle 52 is rotated in a counterclockwise direction, as indicated by the arrow 90 in Fig. 3 of the drawing, the lug 76 will be drawn away from engagement with the stop 78. Simultaneously, the pawl 84 remaining engaged in the ratchet tooth, as best shown in Fig. 4 of the drawing, will pull the disc 66 overcenter to move the lug 76 inwardly into the position shown in Fig. 4 wherein it will pass the stop 78 to permit continued rotation of the shaft 44 and the dispensing roller 40 through another dispensing operation.

Therefore, the disc 66 rocks or oscillates upon the mounting plate 58 between a first locked position in which it is locked against rotation by the impingement of the lug 76 on the stop 78 and a second position in which it is freed from engagement with the stop 78 so that rotation of the shaft 44 and the dispensing roller 40 through a dispensing operation may be accomplished.

The unbalance of the disc 66 normally tends to urge said disc into the second unlocked position shown in Figs. 4 and 5 of the drawing and this tendency is overcome during the dispensing operation to throw the lug 76 into engagement with the stop 78 by a combination of two factors, namely: the centrifugal force encountered during relatively rapid rotation of the handle 52 which tends to throw the disc to the left, as best shown in Fig. 3 of the drawing, and the fact that when the disc 66 is located in the position shown in Fig. 3, it has not reached a point in its rotational path where there is a gravitational effect sufficient to return the disc to its inoperative position.

Moreover, during the rotation of the disc 66 through a dispensing operation, as best shown in Fig. 5 of the drawing, the pawl 84 is in frictional engagement with the peripheral edge of the disc 66 and the weight thereof is imposed upon said disc. Thus, as the disc 66 is rotated, the weight of the pawl 84 together with the above mentioned factors of centrifugal force and gravitational effect tend to maintain the disc 66 in the position shown in Fig. 5 wherein the lug 76 has its end juxtaposed to the peripheral edge of the mounting plate 58 so that it will ultimately impinge upon the stop 78 and prevent continued dispensing rotation of the shaft 44 and the dispensing roller 40 mounted thereupon.

Conversely, when the lug 76 has impinged upon the stop 78 to prevent dispensing rotation of the shaft 44 and the dispensing roller 40 and the handle 52 are rotated in a counterclockwise direction to release the lug 76 from engagement with the stop 78, the engagement of the pawl 84 with the pawl tooth will tend to pull the disc overcenter, as best shown in Fig. 4 of the drawing, to rock the disc 66 into the second unblocked position wherein the end of the lug 76 is displaced inwardly away from the periphery of the mounting plate 58 and a dispensing action can once again be initiated.

If an attempt is made to continue the rotation of the shaft 44 in a counterclockwise direction which would ultimately result in either the jamming or dislodgement of the strip of towelling 20 between or from the rollers 38 and 40, the pawl 84 will engage one of the ratchet teeth 82 constituting the second detent means 80 to prevent such counterclockwise rotation.

Of course, the fact that the centrally located opening 68 is of somewhat greater diameter than the boss 60 of the mounting plate 58 which it encompasses permits oscillation of the disc 66 on the mounting plate 58. However, the opposite edges of the opening 68 constitute limiting means for preventing movement of the disc on the mounting plate 58 beyond the first and second positions. Therefore, the necessity for separate motion-limiting means is obviated and a minimum number of component parts which are subject to wear or damage by abuse is incorporated in the rotation control unit 50.

Furthermore, since the number of parts has been reduced, the amount of space occupied by the rotation control unit 50 is correspondingly reduced and the action of the rotation control unit 50 is much simpler than that encountered in conventional control units.

We claim as our invention:

1. In a dispensing machine for strip material, the combination of: a housing; a rotary member mounted in said housing and engageable with said strip to control the dispensing thereof; supporting means for said rotary member; a rockable member rotatable with and oscillatably supported on said rotary member; a fixed stop in said housing engageable by said rockable member to limit the dispensing rotation of said rotary member; and a movable stop in said housing engageable with said rockable member for limiting reverse rotation of said rotary member.

2. In a dispensing machine for strip material, the combination of: a housing; a rotary member mounted in said housing and engageable with said strip to control the dispensing thereof; support means for said rotary member including an axially extending rotatable shaft; a gravity-actuated, rockable member encompassing said shaft rotatable with and oscillatably supported on said rotary member; and a fixed stop in said housing engageable by said rockable member to limit the dispensing rotation of said rotary member.

3. In a dispensing machine for strip material, the combination of: a housing; a rotary member mounted in said housing and engageable with said strip to control the dispensing thereof; support means for said rotary member including an axially extending rotatable shaft; a rockable member encompassing said shaft rotatable with and oscillatably supported on said rotary member; a fixed stop in said housing engageable by said rockable member to limit the dispensing rotation of said rotary member; and a movable stop in said housing engageable with said rockable member for limiting reverse rotation of said rotary member.

4. In a dispensing machine for strip material, the combination of: a housing; a rotary member mounted in said housing and engageable with said strip to control the dispensing thereof; support means for said rotary member including an axially extending rotatable shaft; a rockable member having a centrally located opening for the reception of said shaft, said rockable member being rotatable with and oscillatably supported on said rotary member, the oscillation of said rockable member upon said rotary member being limited by the impingement of the edge of said opening on said shaft; and a fixed stop in said housing engageable by said rockable member to limit the dispensing rotation of said rotary member.

5. In a dispensing machine for strip material, the combination of: a housing; a rotary member mounted in said housing and engageable with said strip to control the dispensing thereof; supporting means for said rotary member; a rockable member rotatable with and oscillatably supported on said rotary member, said rockable member having detent means thereupon; a fixed stop in said housing engageable by said detent means to limit the dispensing rotation of said rotary member; and a movable stop in said housing engageable with said rockable member for limiting reverse rotation of said rotary member.

6. In a dispensing machine for strip material, the combination of: a housing; a rotary member mounted in said housing and engageable with said strip to control the dispensing thereof; support means for said rotary member including an axially extending rotatable shaft; a rockable member having detent means thereupon and a centrally located opening for the reception of said shaft, said rockable member being rotatable with and oscillatably supported on said rotary member, the oscillation of said rockable member upon said rotary member being limited by the impingement of the edge of said opening on said shaft; and a fixed stop in said housing engageable by said detent means to limit the dispensing rotation of said rotary member.

7. In a rotation control unit for a rotary member mounted upon a shaft, the combination of: a rockable plate secured to said member for rotation therewith, said plate having a centrally located opening therein and encompassing said shaft and being oscillatable on said member between first locked and second unlocked positions and having detent means thereupon to temporarily maintain said member in said first position, the opposite edges of said opening engaging said shaft to prevent movement of said plate beyond said first and second positions; and a fixed stop located adjacent the periphery of said plate engageable by said detent means.

8. In a rotation control unit for a rotary member mounted upon a shaft, the combination of: a disc pivotally mounted at one edge upon said member for oscillation thereupon and rotation therewith, said disc being unbalanced for oscillation during movement of said rotary member between a first, locked position and a second, unlocked position and having first and second detent means thereupon; a fixed stop engageable by said first detent means when said disc is disposed in said first, locked position; and a movable stop mounted adjacent said disc for engagement by said second detent means to limit rotation of said rotary member in a reverse direction.

9. In a dispenser for strip material, the combination of: a housing for the reception of a supply of strip material, said housing having a dispensing opening located adjacent its forward edge; a mounting frame removably supported within said housing adjacent said opening and spanning the same; a pair of dispensing rollers mounted for rotation in said frame; means for rotating one of said rollers having an actuating handle connected thereto and extending from said housing; movable detent means connected to one of said rollers; and stop means on said frame engageable by said detent means to limit the dispensing operation of said rollers.

10. In a dispenser for strip material, the combination of: a housing for the reception of a supply of strip material, said housing having a dispensing opening located adjacent its forward edge; a mounting frame removably supported within said housing adjacent said opening and spanning the same; a pair of dispensing rollers mounted for rotation in said frame; means for rotating one of said rollers having an actuating handle connected thereto and extending from said housing; an oscillatable member connected to one of said rollers, said member having detent means thereupon and being oscillatable between a first locked and a second unlocked position; and stop means on said frame engageable by said detent means to limit the dispensing operation of said rollers.

11. In a dispenser for strip material, the combination of: a housing for the reception of a supply of strip material, said housing having a dispensing opening located adjacent its forward edge; a mounting frame removably supported within said housing adjacent said opening and spanning the same; a pair of dispensing rollers mounted for rotation in said frame; means for rotating one of said rollers having an actuating handle connected thereto and extending from said housing; an oscillatable member connected to one of said rollers, said member having first and second detent means thereupon and being oscillatable between a first locked and a second unlocked position; stop means on said frame engageable by said first detent means to limit the dispensing operation of said rollers; and a movable stop mounted on said frame and engageable with said second detent means to limit reverse rotation of said rollers.

12. In a rotation control unit for a rotatable member connected to a shaft, the combination of: a rockable disc pivotally secured to said member for rotation therewith, said disc having a centrally located opening therein whose diameter is substantially greater than the diameter of said shaft to permit said disc to be mounted in encompassing relationship with said shaft and to be rockable on its pivotal connection to said member between first locked and second unlocked positions, the opposite edges of said opening engaging said shaft to prevent movement of said disc beyond said first and second positions, said disc incorporating a lightening aperture adapted to unbalance said disc and said disc having a radially extending detent thereupon contiguous to said lightening aperture; and a fixed stop located adjacent the periphery of said disc engageable by said detent.

13. In a rotation control unit for a rotatable member mounted upon a shaft, the combination of: a rotatable mounting plate secured on said shaft for rotation therewith and connected to said rotatable member, said mounting plate having a cylindrical boss encompassing said shaft; a rockable disc pivotally secured to said mounting plate and having a centrally located opening therein encompassing said boss and of greater diameter than said boss, said disc being oscillatable on said mounting plate between first locked and second unlocked positions and having radially extending detent means thereupon to temporarily maintain said disc in said first position, the opposite edges of said opening engaging said boss to prevent movement of said disc beyond said first and second positions, said disc incorporating additional detents in the perimeter thereof; a fixed stop located adjacent the periphery of said disc engageable by said detent means; and a movable stop engageable with said additional detents to prevent reverse rotation of said disc and to dislodge said detent from said fixed stop when said reverse rotation is initiated.

References Cited in the file of this patent

UNITED STATES PATENTS

| | | |
|---|---|---|
| 2,134,631 | Birr | Oct. 25, 1938 |
| 2,291,047 | Lewis et al. | July 28, 1942 |